(12) United States Patent
Maumus et al.

(10) Patent No.: US 8,038,854 B2
(45) Date of Patent: Oct. 18, 2011

(54) ELECTROLYSIS INSTALLATION

(75) Inventors: Jean-Pierre Maumus, Saint Medard en Jalles (FR); Charles Dumont, Lacanau de Mios (FR); François Abbe, Martignas (FR)

(73) Assignee: Snecma Propulsion Solide, Le Haillan (FR)

( * ) Notice: Subject to any disclaimer, the term of this patent is extended or adjusted under 35 U.S.C. 154(b) by 258 days.

(21) Appl. No.: 12/370,197

(22) Filed: Feb. 12, 2009

(65) Prior Publication Data

US 2009/0205952 A1 Aug. 20, 2009

(30) Foreign Application Priority Data

Feb. 14, 2008 (FR) ...................................... 08 50943

(51) Int. Cl.
*C25B 9/08* (2006.01)
(52) U.S. Cl. ........ 204/256; 204/258; 204/252; 205/619; 205/620
(58) Field of Classification Search .................. 205/619, 205/620; 204/252, 256, 258
See application file for complete search history.

(56) References Cited

U.S. PATENT DOCUMENTS

| 4,944,996 | A | 7/1990 | Bauer et al. | |
|---|---|---|---|---|
| 5,238,568 | A | 8/1993 | Fely et al. | |
| 5,465,023 | A | 11/1995 | Garner | |
| 5,551,904 | A | 9/1996 | Hedges et al. | |
| 2004/0238374 | A1 * | 12/2004 | Tojo et al. | 205/619 |
| 2005/0006248 | A1 * | 1/2005 | Tojo et al. | 205/619 |
| 2005/0224366 | A1 * | 10/2005 | Hodgson et al. | 205/619 |

FOREIGN PATENT DOCUMENTS

JP 59229487 A 12/1984

* cited by examiner

*Primary Examiner* — Bruce Bell
(74) *Attorney, Agent, or Firm* — Weingarten, Schurgin, Gagnebin & Lebovici LLP (57) ABSTRACT

The invention relates to an electrolysis installation comprising at least two rows of electrodes that are immersed at least in part in a liquid electrolyte giving off one or more gaseous species of corrosive nature at the electrodes, at least one separation membrane being disposed between two adjacent rows of electrodes. Each membrane is constituted by carbon fiber reinforcement stiffened by a carbon matrix and presents porous portion that is permeable to ions and impermeable to the or each gaseous species, given off at the electrolytes.

20 Claims, 7 Drawing Sheets

ELECTROLYSIS INSTALLATION

BACKGROUND OF THE INVENTION

Figure 1:
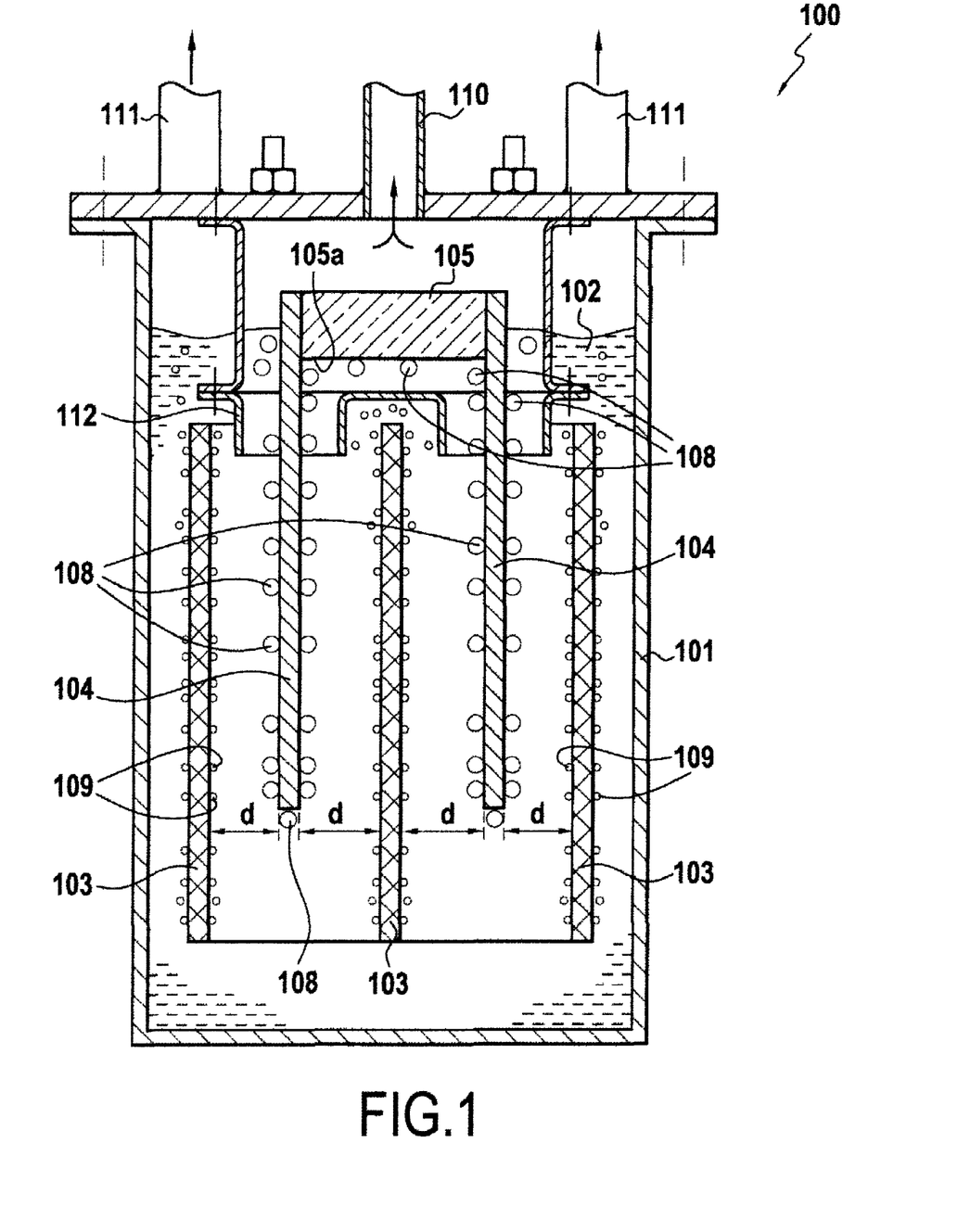
FIG. 1, described above, is a section view of an electrolysis installation in operation.

The present invention relates to the field of electrolysis cells or installations. FIG. 1 is a diagram showing an electrolysis cells or installation 100 used for producing fluorine. The installation 100 comprises a vessel 101 containing an electrolyte 102, e.g. a solution of hydrofluoric acid (HF), and having immersed therein electrodes of two types, namely cathodes 103 and anodes 104. The anodes 104 are fastened and electrically connected to opposite sides of a busbar 105. The busbar 105 simultaneously provides support and delivers electrolysis current for the anodes 104. In well-known manner, the busbar 105 is connected to the positive terminal of a direct current (DC) generator (not shown in the figure), while the cathodes 103 are connected to the negative terminal of the generator. The anodes 104 are distributed longitudinally on either side of the busbar 105 and project beyond the bottom face 105a of the busbar.

FIG. 1 shows the electrolysis installation 100 while it is in operation, i.e. while the electrodes 103 and 104 are immersed in the electrolyte and are being fed with direct current by the generator. For example, with an electrolyte that is constituted by hydrofluoric acid, electrolysis gives rise to bubbles of gaseous fluorine 108 being given off at the anodes 104 and to bubbles of hydrogen 109 being given off at the cathodes 103. The bubbles of these two gaseous species rise to the surface of the electrolyte and are collected by independent ducts 110 and 111 in the top portion of the electrolysis installation 100. A diaphragm 112 is located level with the top portions of the electrodes so as to enable the bubbles of gaseous fluorine 108 to be collected selectively by the duct 110, and the bubbles of hydrogen 109 to be collected by the ducts 111.

The cathodes 104 and the anodes 103 are spaced apart from one another by a determined distance d in order to prevent the hydrogen and the fluorine that are given off in gaseous form from mixing. This distance d makes it possible to ensure that bubbles of gaseous fluorine 108 rise along the anodes 104 without risk of coming into contact with the bubbles of hydrogen 109 that rise along the cathodes 103.

Nevertheless, such spacing between the anodes and the cathodes reduces the efficiency of the electrolysis installation. The electrochemical efficiency or Faraday efficiency of an electrolysis installation, i.e. the ratio of the volume of gas actually produced (here fluorine) divided by the volume of gas as calculated from the electrical energy supplied, depends in particular on the distance between the anodes and the cathodes. In other words, the Faraday efficiency decreases with increasing distance between the anodes and the cathodes. Furthermore, as shown in FIG. 1, the distance d that is imposed between the various rows of electrodes 103 and 104 limits the number of rows of electrodes that can be placed inside the vessel 101, thereby penalizing the productivity of the electrolysis installation.

In order to reduce the distance the cathodes and the anodes, it is known to place a membrane therebetween. Nevertheless, in an electrolysis installation for producing gaseous species that are corrosive, such as fluorine, it is necessary for a membrane to be available that presents very particular corrosion-resistance characteristics. When producing fluorine by electrolysis, as described above, the bubbles of gaseous fluorine that are given off give rise to corrosion and to erosion of the elements of the installation with which they come into contact during electrolysis. A membrane located close to the anodes comes into contact with most of the bubbles of fluorine rising towards the surface of the electrolyte. The membrane is thus subjected to the combined corrosion-erosion phenomenon that results from the chemical nature of the gaseous species constituting the bubbles in association with the effects of the bubbles traveling along the membrane. The membrane used must also be sufficiently stiff not to move under the effect of movement of the electrolyte bath or of the bubbles, in order to guarantee good separation between the species that are given off and avoid any contact with the electrodes.

The materials presently used for making separation membranes do not enable sufficient resistance to the corrosion-erosion phenomenon to be obtained and, by degrading prematurely, they run the risk of becoming permeable to the gaseous species that are given off. One solution for providing better resistance would be to increase membrane thickness, but that would be equivalent to increasing the distance between the cathodes and the anodes, and would consequently reduce the Faraday efficiency and the productivity of the installation.

OBJECT AND SUMMARY OF THE INVENTION

An object of the present invention is to remedy the above-mentioned drawbacks by proposing novel designs of electrolysis installations including separation membranes that enable the electrodes constituting the anode and cathode zones to be moved closer together and that withstand the above-mentioned corrosion-erosion phenomenon effectively.

To this end, the present invention proposes an electrolysis installation comprising rows of electrodes that are immersed at least in part in a liquid electrolyte that gives off one or more gaseous species of corrosive nature at the electrodes, the installation further comprising, in accordance with the invention, at least one separation membrane that is constituted by fine carbon fiber reinforcement stiffened by a carbon matrix, the membrane further presenting a porous portion that is permeable to ions but impermeable to the or each gaseous species given off at the electrodes.

Thus, with the separation membrane of the invention, it is possible to reduce the distance between the adjacent cathodes and anodes in the electrolysis installation and consequently to optimize the Faraday efficiency, even in the presence of corrosive gaseous species being given off. Since ions have dimensions that are much smaller than bubbles of gas, the membrane in the installation of the invention presents permeability that allows ions to pass through (a condition that is necessary for the electrolysis reaction to take place), but without also passing bubbles of the gaseous species given off on either side of the membrane. By reducing the distance between each series of electrodes, it is also possible to have a larger number of rows of electrodes in a given volume of vessel and thereby increase the productivity of the installation.

The membrane is made of a carbon/carbon material since that material withstands the corrosion-erosion phenomenon particularly well. Consequently, the membrane of the invention presents a long lifetime, thus ensuring great reliability in its function of keeping the gaseous species separate.

The membrane of the installation of the invention may be made solely of carbon/carbon material without modification, i.e. it need not be coated. In a variant embodiment, the surface of one or both faces of the membrane may be modified by treatment or coated with one or more particular materials, e.g. for the purposes of improving or reducing wetting or of conferring particular electrical properties.

In addition, by using fine fiber reinforcement that is densified by a carbon matrix, a membrane is obtained that is of small thickness while nevertheless being stiff. The membrane may also present an architecture of a particular shape, for example it may present a corrugated shape, thereby making it possible to further increase its stiffness.

In its porous portion, the membrane of the invention presents thickness lying in the range 1.5 millimeters (mm) to 5 mm, thereby occupying very little space.

In an aspect of the invention, the membrane has through openings extending in the thickness direction of the reinforcement. These openings are of a width substantially lying in the range 0.2 mm to 5 mm.

The openings may be present ab initio, i.e. they may stem from the intrinsic porosity of the membrane, or else they may be machined therein.

The openings may be of arbitrary shape. As non-limiting examples, they may be in the form of holes having a diameter lying in the range 0.2 mm to 5 mm, or in the form of slots of width lying in the range 0.2 mm to 5 mm. The openings may be of varying section, i.e. diverging or converging, depending on the bubbles of the gaseous species under consideration. With openings in the form of slots or the like, the openings may be oriented at an angle lying in the range 0° to 90° relative to the longitudinal direction of the membrane.

In another aspect of the invention, the openings are oriented at a determined angle relative to the plane of the reinforcement. In particular, they may be oriented perpendicularly or obliquely relative to the plane of the reinforcement.

In yet another aspect of the invention, the membrane also includes a fastener portion that is connected to the porous portion.

The present invention also provides a fabrication method for making an electrolysis installation including at least two rows of electrodes immersed at least in part in a liquid electrolyte that gives off one or more gaseous species of corrosive nature at the electrodes, at least one separation membrane being placed between the rows of electrodes, wherein each membrane is made by forming carbon fiber reinforcement, densifying said reinforcement with a carbon matrix, and forming a porous portion in the densified reinforcement, said porous portion being permeable to ions and impermeable to the or each gaseous species given off at the electrodes.

In an aspect of the invention, the porous portion of the membrane presents a thickness lying in the range 1.5 mm to 5 mm.

In another aspect of the invention, through openings are formed in the porous portion in the thickness direction of the reinforcement. The openings may present a shape of any type, and in particular they may be in the form of holes or slots of width lying in the range 0.2 mm to 5 mm. The section of the openings may be constant or varying (diverging or converging sections). The openings may be formed perpendicularly or at a determined angle relative to the plane of the reinforcement. with openings in the form of slots or the like, the openings may be oriented at an angle that lies in the range 0° to 90° relative to the longitudinal direction of the membrane.

The porous portion may also be formed with a particular architecture enabling its stiffness to be reinforced. In particular, it may present a corrugated shape.

The method also includes forming a fastener portion connected to the porous portion so as to enable the membrane to be hooked in place in the electrolysis installation and held in position between the electrodes.

The method may also include a step of modifying or coating at least one of the surfaces of the porous portion of the membrane.

BRIEF DESCRIPTION OF THE DRAWINGS

Other characteristics and advantages of the invention appear from the following description of particular embodiments of the invention given as non-limiting examples, with reference to the accompanying drawings, in which.

DETAILED DESCRIPTION OF AN EMBODIMENT

A particular but non-exclusive field of application for the invention is that of electrolysis installations for use in producing gaseous species of a corrosive nature such as fluorine or chlorine, for example. The present invention proposes reducing the distance between the cathodes and the anodes in such installations in order to increase their production efficiency. For this purpose, the present invention proposes interposing a separation membrane between two adjacent series of electrodes (cathodes and anodes), the membrane being constituted by a fine stiff plate of carbon/carbon (C/C) composite material that presents permeability to ions but that remains impermeable relative to the bubbles of gas given off at each electrode. The membrane of C/C material may be used as such, i.e. without surface coating or treatment, or on the contrary it may be coated or treated on one or both of its faces, e.g. for the purposes of improving or reducing its wettability or of giving it particular electrical properties.

The C/C material imparts its own stiffness to the membrane, which stiffness may be reinforced by giving a particular architecture to the plate (e.g. by creating corrugations) so as to avoid contact being made with the anodes or the cathodes in the event of movements of the electrolyte bath.

In order to achieve such controlled permeability, and as explained in greater detail below, the membrane comprises a porous structure having openings or pores (holes, slots, etc.) of dimensions to allow ions to pass through while preventing bubbles of gas from passing through. This is possible because ions present dimensions that are much smaller than those of bubbles of gas.

By allowing ions to pass through while preventing contact being made between the gaseous species given off respectively on either side of the membrane, it is possible to reduce the distance of the spacing between two series of electrodes compared with the distance that is usually needed in the absence of such a membrane for the purpose of avoiding any contact between the gaseous species. In order to reduce significantly the distance between the electrodes and best optimize the efficiency and the productivity of the installation, it is necessary to have a membrane that is as fine as possible. Nevertheless, the membrane must be capable of conserving its own structural integrity in the face of the corrosion-erosion phenomenon in order to perform its function of keeping the gaseous species separate. In particular, the porosity of the membrane that allows ions to pass through must not increase over time under the effect of the corrosion-erosion phenomenon, since that would run the risk of the membrane becoming permeable to the bubbles of gas that are given off.

For this purpose, the membrane of the invention is made of a carbon/carbon (C/C) composite material that, in known manner, is a material made up of carbon fiber reinforcement densified by a carbon matrix and that presents very good resistance to corrosion and also to erosion.

The fabrication of C/C composite material parts is well known. It comprises making a carbon fiber preform of shape close to that of the part that is to fabricated, and densifying the preform with the matrix. The fiber preform constitutes the reinforcement of the part and its function is essential in terms of mechanical properties. The preform is obtained from fiber textures: yarns, tows, braids, fabrics, felts, . . . . Shaping is performed by winding, weaving, stacking, and possibly needling two-dimensional plies of fabric or sheets of tows . . . .

The fiber reinforcement may be densified using a liquid technique (impregnating with a resin that is a precursor of the carbon matrix, and transforming the resin by cross-linking and pyrolysis, which processes may be repeated), or by a gaseous technique (chemical vapor infiltration (CVI) of the carbon matrix).

Embodiments of separation membranes in accordance with the invention are described below.

Figure 2:
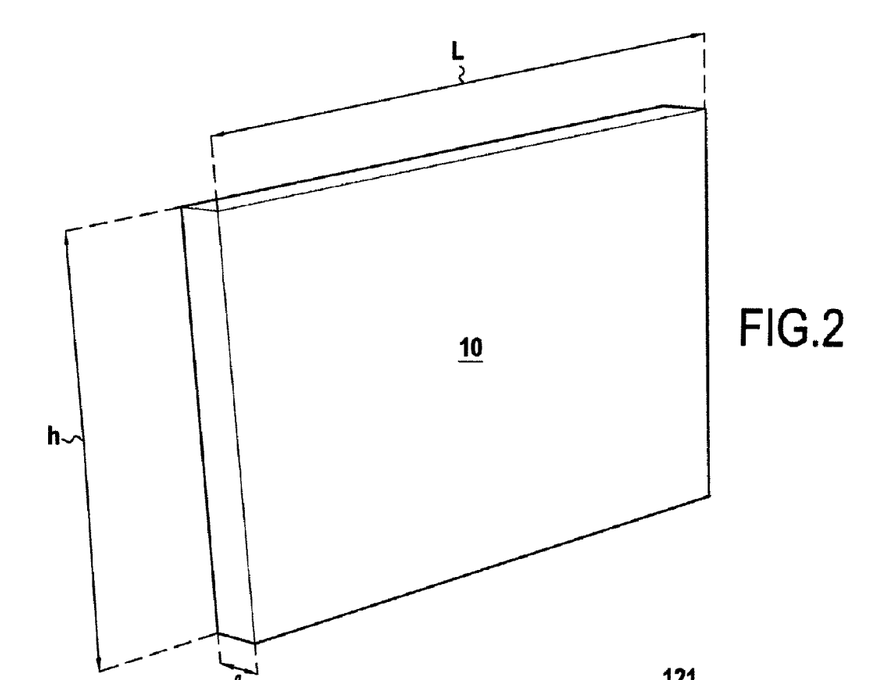
FIG. 2 is a diagrammatic perspective view of a plate of C/C composite material from which a separation membrane is fabricated in accordance with an implementation of the invention.
Figure 3:
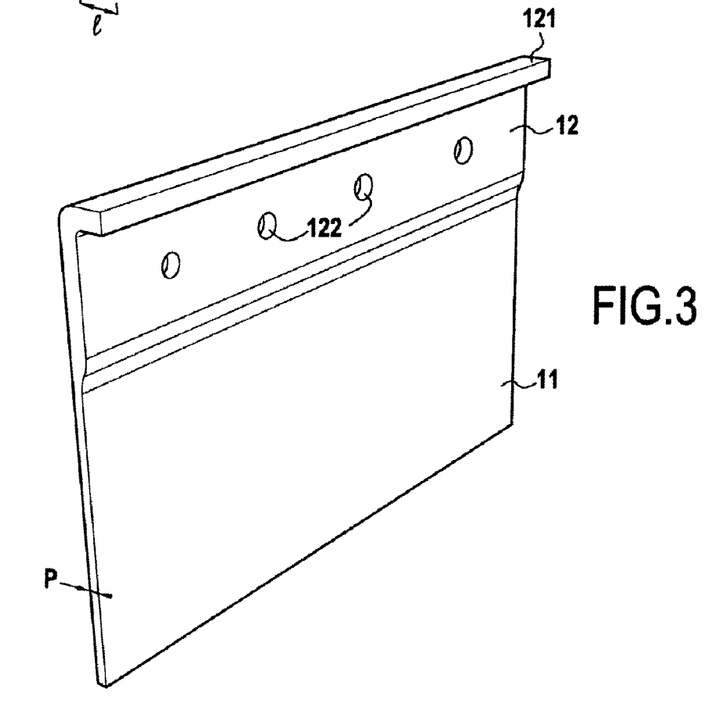
FIG. 3 shows the general shape of a separation membrane as machined from the FIG. 2 plate.

In a first implementation of the method of the invention for fabricating a separation membrane, a fiber preform is made from a needled carbon fabric. The preform is then densified with pyrolytic carbon by CVI to obtain C/C material with a relative density of at least 1.4. As shown in FIG. 2, this produces a plate 10 of C/C composite material that presents, by way of example, a length L of 1000 mm, of width l of 20 mm, and of height h of 500 mm, and that is sufficiently rigid to be machined to obtain the final shape of the membrane. More precisely, and as shown in FIG. 3, the plate 10 is machined to form a portion 11 referred to as its "covering zone", having a thickness P lying in the range 1.5 mm to 5 mm. The covering zone 11 corresponds to the porous portion of the membrane that is used for separating the gas streams given off by the anodes and the cathodes while allowing ions to pass through. In the top portion of the plate 10, a fastener portion 12 is also machined that comprises a hooking flange 121 and fastener orifices 122 for receiving fastener members (e.g. screws) as explained below with reference to FIG. 13.

Once the final shape has been machined, openings are pierced in the covering zone 11, e.g. by means of a jet of water under pressure. These openings may be of arbitrary shape, such as, for example: holes, slots, etc. The size of the openings (e.g. the diameter of holes or the width of slots) lies in the range 0.2 mm to 5 mm.

Figure 4:
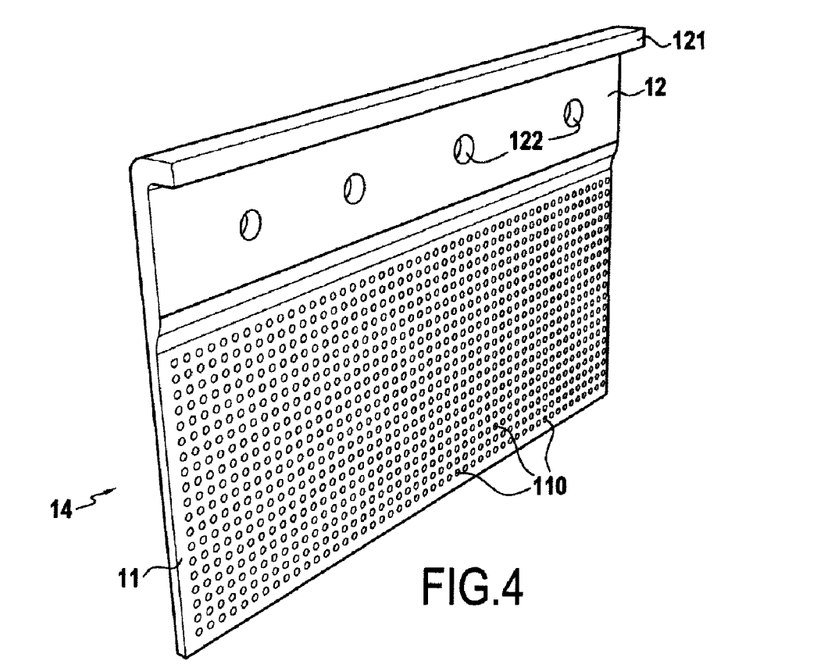
FIG. 4 is a perspective view of a separation membrane fabricated from the FIG. 2 plate.
Figure 5A:
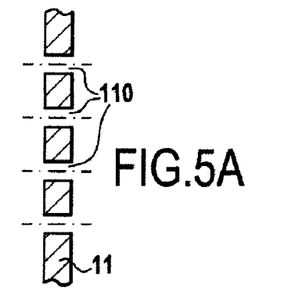
FIGS. 5A and 5B are fragmentary section views showing openings respectively oriented at 90° and at 45° relative to the reinforcing plane of the membrane.
Figure 5B:
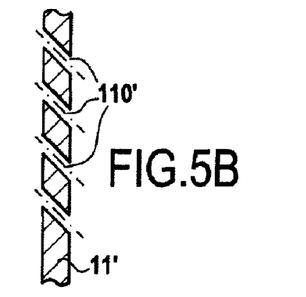

As shown in FIG. 4, a membrane 14 is obtained comprising a fastener portion 12 together with a covering zone 11 having a plurality of openings in the form of holes 110 and corresponding to the porous portion of the membrane. The holes 110 in the covering zone 11 may extend perpendicularly relative to the plane of the membrane as shown in FIG. 5A. Nevertheless, the holes may be oriented at an arbitrary angle relative to the reinforcing plane of the membrane, like, for example, the holes 110' of the covering portion 11' shown in FIG. 5 which are oriented at an angle of 45° relative to the reinforcing plane.

The membrane 14 may be used without modification. Nevertheless, it is possible to subject the membrane 14 to additional treatments such as additional infiltration of pyrolytic carbon for calibrating the pierced openings, depositing a material for changing the wettability of the membrane (e.g. silicon carbide (SiC)), or indeed treatment for modifying the surface properties of the membrane.

Figure 6:
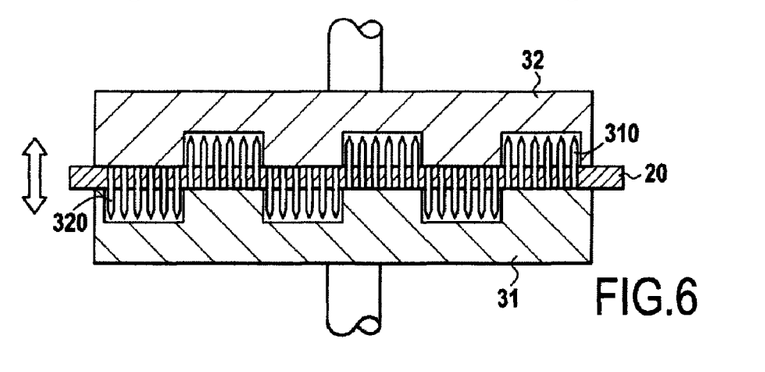
FIG. 6 is a diagrammatic view of a mold and of a counter-mold used for forming a separation membrane in accordance with another implementation of the invention.

In accordance with another implementation of the method of fabricating a separation membrane of the invention, a fiber preform is made from a needled carbon fabric having a thickness of about 12 mm. As shown in FIG. 6, a preform 20 is shaped in a mold 31 and a counter-mold 32, each having spikes 310 or 320 in register with the porous portion that is to be formed in the membrane. The other portion of the mold and of the counter-mold (not shown in FIG. 6) presents a shape that corresponds to the fastener portion that is also to be formed.

Thereafter, the reinforcement is consolidated by a liquid technique while it is being held in shape, i.e. the reinforcement is impregnated with a carbon precursor resin and then the resin is transformed into carbon matrix by cross-linking and pyrolysis.

Once the part has been unmolded, it is machined, should that be necessary, in order to adjust the thickness of the covering zone in the range 1.5 mm to 5 mm, and to form the fastener portion, and also to pierce the fastener orifices.

This produces a membrane similar to the membrane shown in FIG. 4 and, as explained above, it can likewise be used either without modification or it can be subjected to additional treatments.

Depending on the shape of the openings that it is desired to obtain, the spikes may be of appropriate shape, for example they may be cylindrical, triangular, or square in shape and of section that may be constant or varying.

In a variant implementation, the membrane may be made as explained above but using a mold and a counter-mold not having spikes. Under such circumstances, the openings are made after unmolding, e.g. using a jet of water under pressure.

Figure 7:
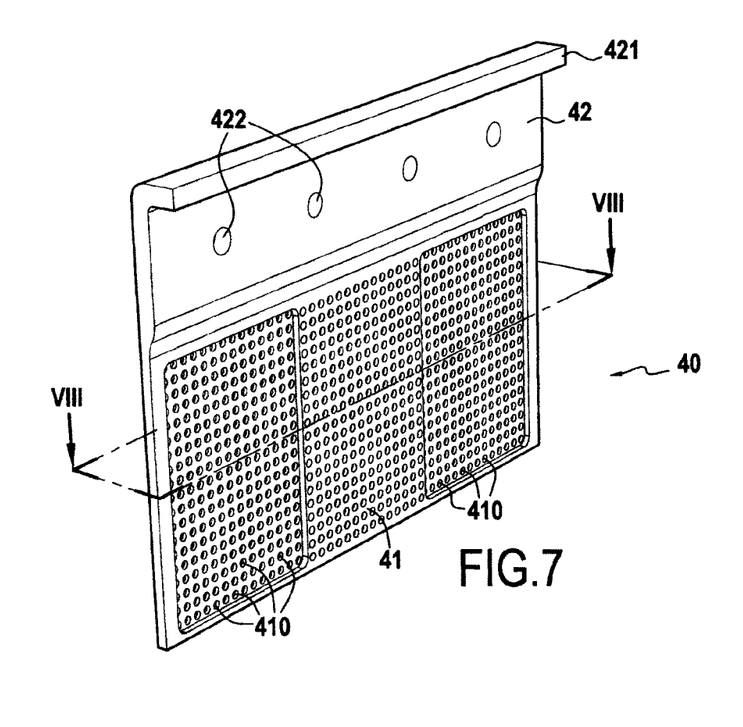
FIGS. 7 and 8 are diagrammatic perspective and fragmentary section views respectively of another embodiment of a membrane of the invention.
Figure 8:
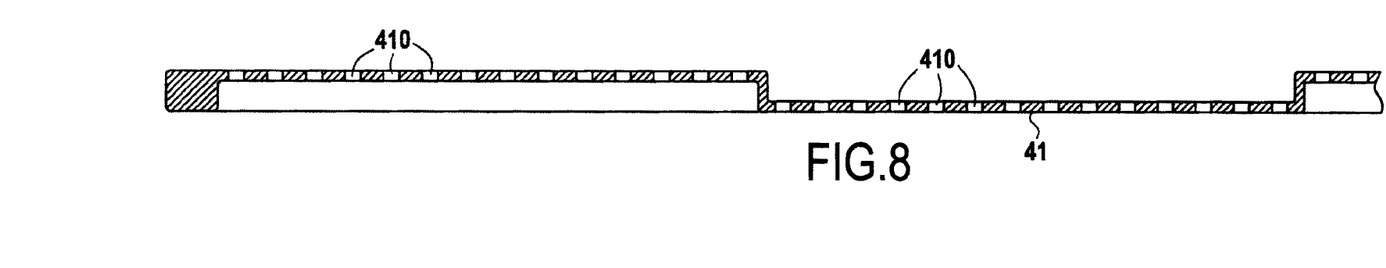

FIGS. 7 and 8 show an embodiment of a separation membrane 40 that differs from that of FIG. 4 in that it presents a corrugated shape in its covering zone 41. This particular architecture serves to reinforce the stiffness of the membrane, and consequently to reinforce its ability to withstand movements of the electrolyte bath. Like the membrane 14 of FIG. 4, the membrane 40 has a plurality of openings 41 in its covering zone that defines the porous portion of the membrane, together with a fastener portion 42 provided with a hooking flange 421 and fastener orifices 422. The corrugations presented by the membrane 40 are small in amplitude and consequently they do not penalize the reduction of the distance between the anodes and the cathodes.

Figure 9:
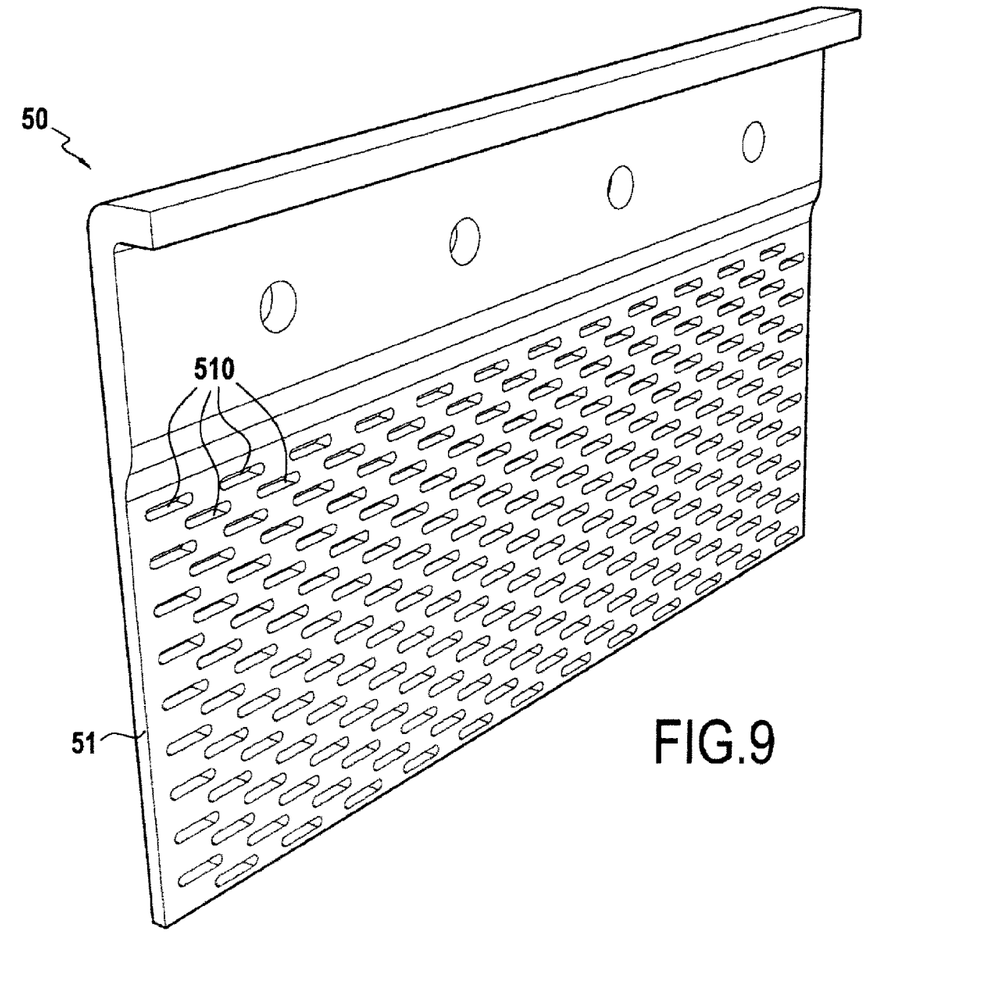
FIGS. 9 to 12 are fragmentary diagrammatic views of other embodiments of a membrane of the invention.

FIG. 9 shows yet another embodiment of the separation membrane 50 that differs from that of FIG. 4 in that instead of having holes in its covering zone 51, it has slots 510. The slots may be oriented at an angle lying in the range 0° to 90° relative to the longitudinal direction of the membrane (in FIG. 9 the slots are oriented at 0°). Furthermore, the slots may pass through the thickness of the membrane in a perpendicular direction (like the holes in FIG. 5A) or along some other angle, such as for example an angle of 45° relative to the plane of the covering zone (like the holes in FIG. 5B).

Figures 10, 11, 12:
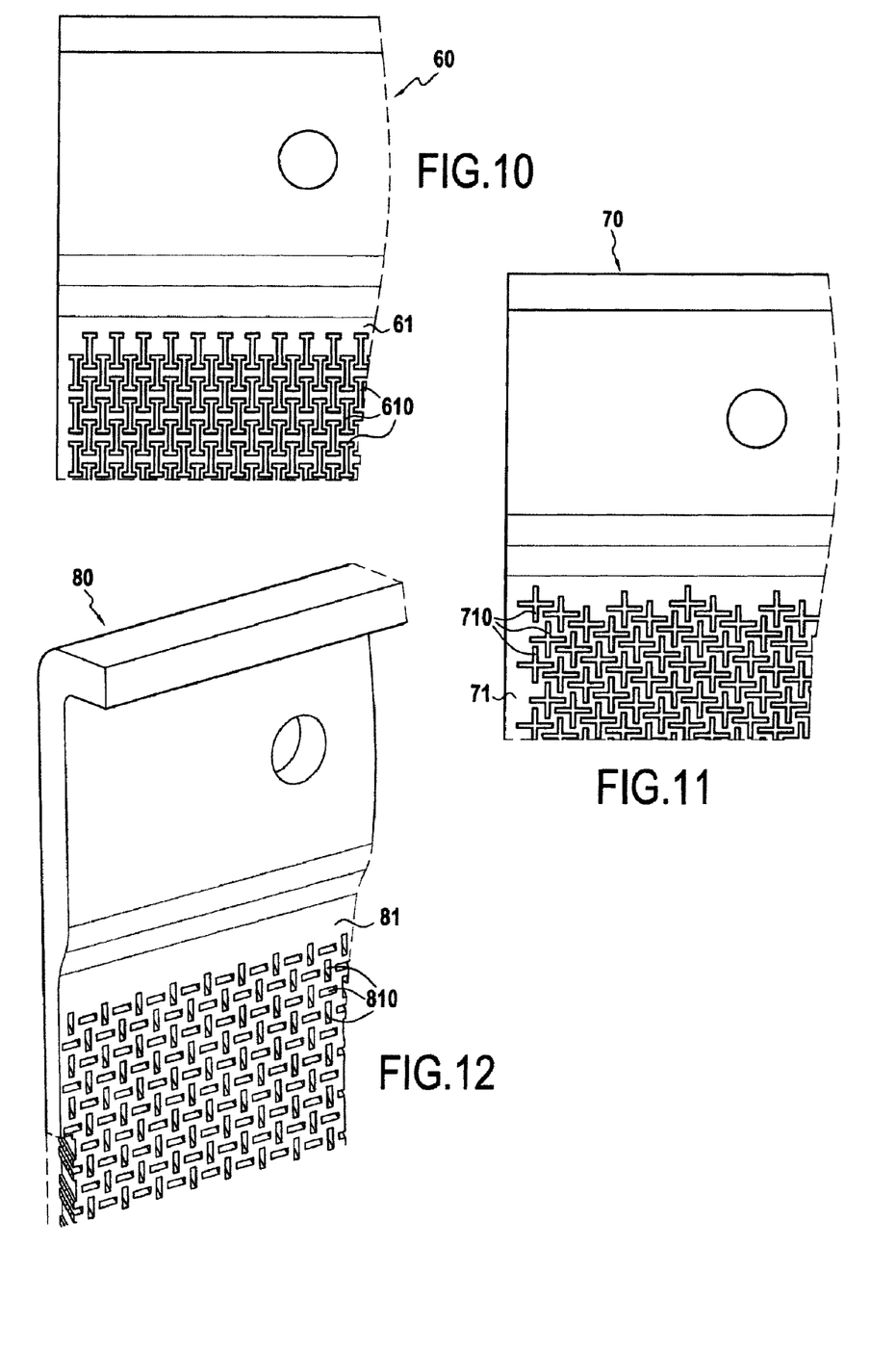

FIGS. 10 to 12 show other embodiments of separation membranes that differ from those described above in that they present openings of different shapes. FIG. 10 shows the membrane 60 having openings 610 in its covering zone 61 that are double-T or I-shaped. FIG. 11 shows a membrane 70 that includes openings 710 in its covering zone 71 that are cross-shaped. FIG. 11 shows the membrane 80 that has openings 810 in its covering zone 81 that are in the form of slots that are oriented in alternately in a direction that is parallel to the longitudinal direction of the membrane, and in a direction that is perpendicular thereto. The width of the openings 610, 710, and 810 lies in the range 0.2 mm to 5 mm. Furthermore, the openings 610, 710, and 810 may be formed in the thickness of the membrane in a direction that is perpendicular (like the holes in FIG. 5A) or at some other angle, such as an angle of 45° relative to the plane of the covering zone (like the holes in FIG. 5B).

After being fabricated, the above-described membranes can be used without modification, i.e. without any particular treatment. Nevertheless, after they have been made, the membranes may be subjected to additional treatments for modifying or imparting special properties to the membrane. Thus, the C/C material of membranes of the invention may be coated in one or more additional materials such as silicon carbide, Teflon®, or any other insulating carbon-containing material. The membranes may also be subjected to treatments, such as for example heat treatments or surface oxidizing treatments in order to modify their surface properties.

Figure 13:
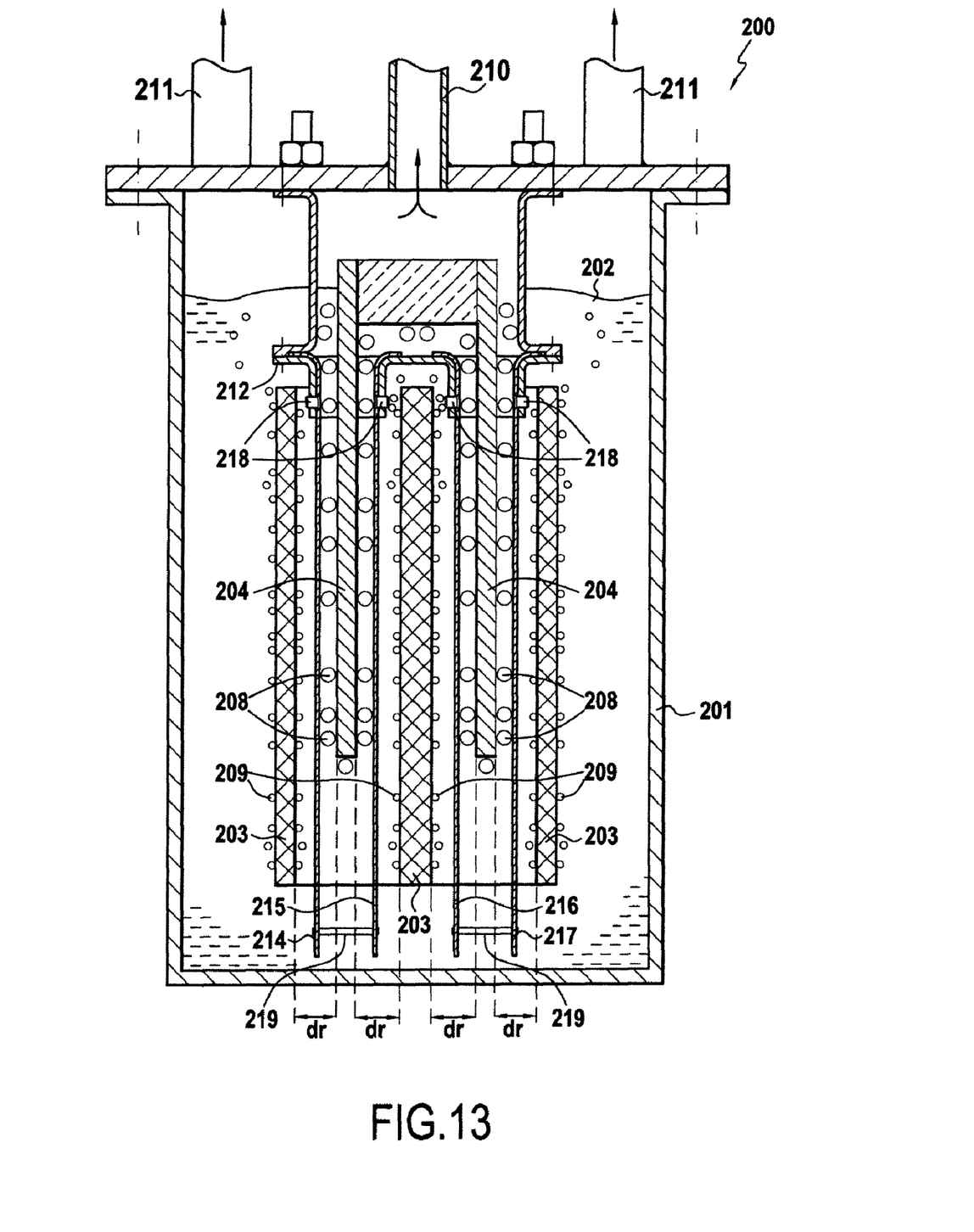
FIG. 13 is a diagrammatic section view of an electrolysis installation including separation membranes in accordance with the invention.

By way of example, FIG. 13 shows how the distance between the cathodes and the anodes can be reduced by using separation membranes of the present invention. In this example, an electrolysis installation 200 is used that is comparable to that described above with reference to FIG. 1 in that it comprises a vessel 201 having the same dimensions and containing an electrolyte 202, e.g. a solution of hydrofluoric acid (HF), in which cathodes 203 and anodes 204 are placed. In accordance with the invention, the installation 200 also has four separation membranes 214 to 217 of the type shown in FIG. 4 that are placed respectively between adjacent rows of cathodes 203 and anodes 204. The membranes 214 to 217 are fastened against the diaphragm 212 via their fastener portions and by means of screws 218. Spacers 219 may also be fastened between two adjacent membranes at their bottom ends.

As described above, since each membrane has a covering zone in which a plurality of openings are formed, ions can be exchanged between the cathodes and the anodes in order to enable the electrolysis reaction to take place. Nevertheless, although the openings in the membranes allow ions to pass, they prevent bubbles of gaseous fluorine 208 as given off at the anodes 204 and bubbles of hydrogen 209 as given off at the cathodes 203 from passing through the membrane.

Consequently, and as shown in FIG. 13 when compared with FIG. 1, the distance d (FIG. 1) that is usually needed between the cathodes and the anodes to prevent the hydrogen and fluorine mixing can be significantly reduced by using the separation membranes of the invention. As shown in FIG. 13, the electrodes are spaced apart by a smaller distance dr that is limited only by the amount of space that is needed between a membrane and an electrode in order to allow the bubbles of gaseous species to be given off at the electrodes and to rise.

By enabling the anodes and the cathodes to be moved closer to one another without risk of the gases mixing, the Faraday efficiency of the installation is improved. In addition, as shown in FIG. 13, for a given volume of vessel, moving the anodes and the cathodes closer together releases space in which it is possible to place additional rows of anodes and cathodes, and thus improves the productivity of the electrolysis installation.

What is claimed is:

1. An electrolysis installation comprising at least two rows of electrodes that are immersed at least in part in a liquid electrolyte giving off one or more gaseous species of corrosive nature at the electrodes, at least one separation membrane being disposed between two adjacent rows of electrodes, wherein the membrane is constituted by carbon fiber reinforcement stiffened by a carbon matrix, and wherein said membrane presents at least one porous portion that is permeable to ions and impermeable to the one or more gaseous species given off at the electrolytes.

2. An installation according to claim 1, wherein the porous portion presents thickness lying in the range 1.5 mm to 5 mm.

3. An installation according to claim 1, wherein the porous portion has through openings going through the thickness of the reinforcement.

4. An installation according to claim 3, wherein the openings present width lying in the range 0.2 mm to 5 mm.

5. An installation according to claim 4, wherein the openings present the form of slots oriented at an angle lying in the range 0° to 90° relative to the longitudinal direction of the membrane.

6. An installation according to claim 3, wherein the openings are oriented at a determined angle relative to the plane of the reinforcement.

7. An installation according to claim 3, wherein the openings are of section that varies in the thickness direction of the membrane.

8. An installation according to claim 1, wherein the porous portion presents a corrugated shape.

9. An installation according to claim 1, wherein said at least one membrane further comprises a fastener portion connected to the porous portion.

10. The installation according to claim 1, wherein each of said electrolytes and the at least one separation membrane have corresponding distal ends below a surface of the liquid, and
wherein the distal end of each at least one separation member is deeper than the distal ends of said electrolytes.

11. A method of making an electrolysis installation comprising at least two rows of electrodes that are immersed at least in part in a liquid electrolyte that gives off one or more gaseous species of corrosive nature at the electrodes, at least one separation membrane being placed between the rows of electrodes, wherein said at least one membrane is made by forming carbon fiber reinforcement, densifying said reinforcement with a carbon matrix, and forming a porous portion in the densified reinforcement, said porous portion being permeable to ions and impermeable to the one or more gaseous species given off at the electrodes.

12. A method according to claim 11, wherein the porous portion presents thickness lying in the range 1.5 mm to 5 mm.

13. A method according to claim 11, wherein through openings are formed in the porous portion in the thickness direction of the reinforcement.

14. A method according to claim 13, wherein openings are formed presenting width lying in the range 0.2 mm to 5 mm.

15. A method according to claim 14, wherein the openings present the form of slots oriented at an angle lying in the range 0° to 90° relative to the longitudinal direction of the membrane.

16. A method according to claim 13, wherein the openings are oriented at a determined angle relative to the plane of the reinforcement.

17. A method according to claim 13, wherein the openings are of section that varies in the thickness direction of the membrane.

18. A method according to claim 11, wherein the porous portion is formed with a corrugated shape.

19. A method according to claim 11, further comprising a step of modifying or coating at least one of the surfaces of the porous portion of the membrane.

20. A method according to claim 11, wherein there is also formed a fastener portion connected to the porous portion.

* * * * *

UNITED STATES PATENT AND TRADEMARK OFFICE
CERTIFICATE OF CORRECTION

| | | |
|---|---|---|
| PATENT NO. | : 8,038,854 B2 | Page 1 of 1 |
| APPLICATION NO. | : 12/370197 | |
| DATED | : October 18, 2011 | |
| INVENTOR(S) | : Jean-Pierre Maumus et al. | |

It is certified that error appears in the above-identified patent and that said Letters Patent is hereby corrected as shown below:

Column 5, line 39, "1" should read -- $\ell$ --.

Signed and Sealed this
Eleventh Day of September, 2012

David J. Kappos
*Director of the United States Patent and Trademark Office*